(12) United States Patent
Zhang

(10) Patent No.: US 8,311,160 B1
(45) Date of Patent: Nov. 13, 2012

(54) EXPLICIT BEAMFORMEE METHOD AND APPARATUS FOR MIMO AND MISO SYSTEMS WITH SINGLE DATA STREAM

(75) Inventor: Hongyuan Zhang, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 831 days.

(21) Appl. No.: 12/396,323

(22) Filed: Mar. 2, 2009

Related U.S. Application Data

(60) Provisional application No. 60/037,543, filed on Mar. 18, 2008.

(51) Int. Cl.
 H04L 27/06 (2006.01)
(52) U.S. Cl. ........ 375/340; 375/260; 375/267; 375/299; 375/347; 455/101; 455/132; 455/296; 455/500; 455/522; 455/562.1; 370/210; 370/334; 370/480; 341/173; 341/180
(58) Field of Classification Search ........... 375/260, 375/267, 299, 340, 347; 455/101, 132, 296, 455/500, 522, 562.1; 370/210, 334, 480; 341/173, 180
 See application file for complete search history.

(56) References Cited

U.S. PATENT DOCUMENTS

| 6,584,161 B2 * | 6/2003 | Hottinen et al. ............... 375/299 |
| 7,515,878 B2 * | 4/2009 | Zhang et al. .................... 455/69 |
| 2008/0187061 A1 * | 8/2008 | Pande et al. .................... 375/260 |
| 2008/0212461 A1 * | 9/2008 | Pande et al. .................... 370/203 |
| 2008/0219373 A1 * | 9/2008 | Zhang et al. .................. 375/262 |

OTHER PUBLICATIONS

"IEEE P802.11n™/D3.00, Draft STANDARD for Information Technology-Telecommunications and information exchange between systems-Local and metropolitan area networks-Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.

Zhang et al., "Applying Antenna Selection in WLANs for Achieving Broadband Multimedia Communications," IEEE Trans. on Broadcasting, vol. 52, No. 4, Dec. 2006.

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, 1999.

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, 1999.

(Continued)

Primary Examiner — Leon Flores

(57) ABSTRACT

Channel state information (CSI) is determined for a single data stream transmitted via a plurality of antennas. Cophasing angles are determined for the plurality of antennas using the CSI. The cophasing angles are quantized, and explicit beamforming feedback is generated based on using the quantized cophasing angles as indices into a look-up table.

15 Claims, 5 Drawing Sheets

OTHER PUBLICATIONS

IEEE Std 802.11b-1999 (Supplement to ANSI/IEEE Std 802.11, 1999 Edition) Supplement to IEEE Standard for Information technology—Telecommunications and information exchange between systems-Local and metropolitan area networks-Specific requirements Part 11.

Wireless LAN Medium Access Control (MAC) and Physical Layer (PHY) specifications: Higher-speed Physical Layer Extension in the 2.4 GHZ Band, *The Institute of Electrical and Electronics Engineers, Inc.*, 1999.

IEEE Std 802.11g/D8.2, Apr. 2003 (Supplement to ANSI/IEEE Std 802.11, 1999 (Reaff 2003)) "Draft Supplement to Standard [for] Information technology-Telecommunications and information exchange between systems-Local and metropolitan area networks-Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.

S. A. Mujtaba, "IEEE P802.11—Wireless LANS, TGn Sync Proposal Technical Specification," doc.: IEEE 802.11-04/0889r6, May 2005.

IEEE Std 802.16e-2005 and IEEE Std 802.16-2004/Cor1-2005 (Amendment and Corrigendum to IEEE Std 802.16-2004), IEEE Standard for Local and metropolitan area networks: Part 16: Air Interface for Fixed and Mobile Broadband Wireless Access Systems: Amendment 2: Physical and Medium Access Control Layers for Combined Fixed and Mobile Operation in Licensed Bands and Corrigendum 1, *The Institute of Electrical and Electronics Engineers, Inc.*, Feb. 28, 2006.

R. Andraka, "A survey of CORDIC algorithms for FPGA based computers," Proc. of the 1998 ACM/SIGDA Sixth International Symposium on Field Programable Gate Arrays, Monterey CA 1998, pp. 191-200.

* cited by examiner

PRIOR ART

EXPLICIT BEAMFORMEE METHOD AND APPARATUS FOR MIMO AND MISO SYSTEMS WITH SINGLE DATA STREAM

CROSS-REFERENCES TO RELATED APPLICATIONS

The present application claims the benefit of U.S. Provisional Application No. 61/037,543, entitled "Fast Explicit Beamformee Algorithm and Architecture for MIMO and MISO Systems with Single Data Stream," filed on Mar. 18, 2008, which is hereby incorporated by reference herein in its entirety.

FIELD OF DISCLOSURE

The present disclosure relates generally to wireless communication systems and, more particularly, to an apparatus and method for performing beamforming calculations for a multiple-input, multiple-output wireless communication system.

BACKGROUND

An ever-increasing number of relatively inexpensive, low power wireless data communication services, networks and devices have been made available over the past number of years, promising near wire speed transmission and reliability. Various wireless technology is described in detail in the 802.11 IEEE Standard, including for example, the IEEE Standard 802.11a (1999) and its updates and amendments, the IEEE Standard 802.11g (2003), as well as the IEEE Standard 802.11n now in the process of being adopted, all of which are collectively incorporated herein fully by reference. These standards have been or are in the process of being commercialized with the promise of 54 Mbps or more effective bandwidth, making them a strong competitor to traditional wired Ethernet and the more ubiquitous "802.11b" or "WiFi" 11 Mbps mobile wireless transmission standard.

Generally speaking, transmission systems compliant with the IEEE 802.11a and 802.11g or "802.11a/g" as well as the 802.11n standards achieve their high data transmission rates using Orthogonal Frequency Division Modulation or OFDM encoded symbols mapped up to a 64 quadrature amplitude modulation (QAM) multi-carrier constellation. The use of OFDM divides the overall system bandwidth into a number of frequency sub-bands or channels, with each frequency sub-band being associated with a respective sub-carrier upon which data may be modulated. Thus, each frequency sub-band of the OFDM system may be viewed as an independent transmission channel within which to send data, thereby increasing the overall throughput or transmission rate of the communication system.

Generally, transmitters used in the wireless communication systems that are compliant with the aforementioned 802.11a/802.11g/802.11n standards as well as other standards such as the 802.16e IEEE Standard, perform multi-carrier OFDM symbol encoding (which may include error correction encoding and interleaving), convert the encoded symbols into the time domain using Inverse Fast Fourier Transform (IFFT) techniques, and perform digital to analog conversion and conventional radio frequency (RF) upconversion on the signals. These transmitters then transmit the modulated and upconverted signals after appropriate power amplification to one or more receivers, resulting in a relatively high-speed time domain signal with a large peak-to-average ratio (PAR).

Likewise, the receivers used in the wireless communication systems that are compliant with the aforementioned 802.11a/802.11g/802.11n and 802.16e IEEE standards generally include an RF receiving unit that performs RF downconversion and filtering of the received signals (which may be performed in one or more stages), and a baseband processor unit that processes the OFDM encoded symbols bearing the data of interest. Generally, the digital form of each OFDM symbol presented in the frequency domain is recovered after baseband downconverting, conventional analog to digital conversion and Fast Fourier Transformation of the received time domain analog signal. Thereafter, the baseband processor performs demodulation (phase rotation) and frequency domain equalization (FEQ) to recover the transmitted symbols, and these symbols are then processed in a viterbi decoder to estimate or determine the most likely identity of the transmitted symbol. The recovered and recognized stream of symbols is then decoded, which may include deinterleaving and error correction using any of a number of known error correction techniques, to produce a set of recovered signals corresponding to the original signals transmitted by the transmitter.

In wireless communication systems, the RF modulated signals generated by the transmitter may reach a particular receiver via a number of different propagation paths, the characteristics of which typically change over time due to the phenomena of multi-path and fading. Moreover, the characteristics of a propagation channel differ or vary based on the frequency of propagation. To compensate for the time varying, frequency selective nature of the propagation effects, and generally to enhance effective encoding and modulation in a wireless communication system, each receiver of the wireless communication system may periodically develop or collect channel state information (CSI) for each of the frequency channels, such as the channels associated with each of the OFDM sub-bands discussed above. Generally speaking, CSI is information defining or describing one or more characteristics about each of the OFDM channels (for example, the gain, the phase and the SNR of each channel). Upon determining the CSI for one or more channels, the receiver may send this CSI back to the transmitter, which may use the CSI for each channel to precondition the signals transmitted using that channel so as to compensate for the varying propagation effects of each of the channels.

An important part of a wireless communication system is therefore the selection of the appropriate data rates, and the coding and modulation schemes to be used for a data transmission based on channel conditions. Generally speaking, it is desirable to use the selection process to maximize throughput while meeting certain quality objectives, such as those defined by a desired frame error rate (FER), latency criteria, etc.

To further increase the number of signals which may be propagated in the communication system and/or to compensate for deleterious effects associated with the various propagation paths, and to thereby improve transmission performance, it is known to use multiple transmit and receive antennas within a wireless transmission system. Such a system is commonly referred to as a multiple-input, multiple-output (MIMO) wireless transmission system and is specifically provided for within the 802.11n IEEE Standard now being adopted. Generally speaking, the use of MIMO technology produces significant increases in spectral efficiency and link reliability, and these benefits generally increase as the number of transmission and receive antennas within the MIMO system increases.

In addition to the frequency channels created by the use of OFDM, a MIMO channel formed by the various transmit and receive antennas between a particular transmitter and a particular receiver includes a number of independent spatial channels. As is known, a wireless MIMO communication system can provide improved performance (e.g., increased transmission capacity) by utilizing the additional dimensionalities created by these spatial channels for the transmission of additional data. Of course, the spatial channels of a wideband MIMO system may experience different channel conditions (e.g., different fading and multi-path effects) across the overall system bandwidth and may therefore achieve different SNRs at different frequencies (i.e., at the different OFDM frequency sub-bands) of the overall system bandwidth. Consequently, the number of information bits per modulation symbol (i.e., the data rate) that may be transmitted using the different frequency sub-bands of each spatial channel for a particular level of performance may differ from frequency sub-band to frequency sub-band.

However, instead of using the various different transmit and receive antennas to form separate spatial channels on which additional information is sent, better transmission and reception properties can be obtained in a MIMO system by using each of the various transmission antennas of the MIMO system to transmit the same signal while phasing (and amplifying) this signal as it is provided to the various transmission antennas to achieve beamforming or beamsteering. Generally speaking, beamforming (also referred to as beamsteering) creates a spatial gain pattern having one or more high gain lobes or beams (as compared to the gain obtained by an omni-directional antenna) in one or more particular directions, while reducing the gain over that obtained by an omni-directional antenna in other directions. If the gain pattern is configured to produce a high gain lobe in the direction of each of the receiver antennas, the MIMO system can obtain better transmission reliability between a particular transmitter and a particular receiver, over that obtained by single transmitter-antenna/receiver-antenna systems.

There are many known techniques for determining a steering matrix specifying the beamsteering coefficients that need to be used to properly condition the signals being applied to the various transmission antennas so as to produce the desired transmit gain pattern at the transmitter. As is known, these coefficients may specify the gain and phasing of the signals to be provided to the transmitter antennas to produce high gain lobes in particular or predetermined directions. These techniques include, for example, transmit-MRC (maximum ratio combining) and singular value decomposition (SVD). While it is known to perform beamforming in a MIMO system in a manner that uses all of the available receiver and transmitter antennas in the MIMO system, which thereby maximizes transmission reliability, the calculations and processing overhead associated with computing the beamsteering coefficients may be significant, depending on the number of transmit and/or receive antennas increases. As a result, beamforming in a MIMO system may significantly increase the system complexity and processing overhead when a relatively large number of transmit and receive antennas are present.

SUMMARY

In one embodiment, a method includes determining channel state information (CSI) for a single data stream transmitted via a plurality of antennas, and determining cophasing angles for the plurality of antennas using the CSI. The method also includes quantizing the cophasing angles, and generating explicit beamforming feedback based on using the quantized cophasing angles as indices into a look-up table.

In some embodiments, generating explicit beamforming feedback may include generating compressed steering vector feedback based on using the quantized cophasing angles as indices into the look-up table.

In some embodiments, generating explicit beamforming feedback also may include generating CSI feedback based on using the quantized cophasing angles as indices into the look-up table.

In some embodiments, determining the cophasing angles and quantizing the cophasing angles may be performed in hardware, and quantized cophasing angles may be transferred, via a hardware/software interface, from the hardware to a controller that executes machine readable instructions. Generating the explicit beamforming feedback may be performed by the controller.

In some embodiments, determining the cophasing angles, quantizing the cophasing angles, and generating the explicit beamforming feedback all may be performed in hardware.

In another embodiment, an apparatus comprises a cophasing angle calculator to calculate a plurality of cophasing angles for a plurality of transmit antennas using channel state information, and a quantizer coupled to the cophasing angle calculator to quantize the plurality of cophasing angles. The apparatus also comprises a beamforming feedback generator to generate explicit beamforming feedback based on the quantized cophasing angles.

In some embodiments, the beamforming feedback generator may be implemented in hardware.

In some embodiments, the beamforming feedback generator may be implemented by a controller, and the apparatus may further comprise a hardware/software interface coupled to the quantizer and the controller, and a memory coupled to the controller. The memory may store instructions that, when executed by the controller, cause the controller to generate explicit beamforming feedback based on the quantized cophasing angles.

In some embodiments, the beamforming feedback generator may be configured to generate the explicit beamforming feedback based on using the quantized cophasing angles as indices into a look-up table.

In some embodiments, the beamforming feedback generator may be configured to generate compressed steering vector feedback based on using the quantized cophasing angles as indices into the look-up table.

In some embodiments, the beamforming feedback generator may be configured to generate CSI feedback based on the quantized cophasing angles.

In some embodiments, the cophasing angle calculator may include one or more coordinate rotation digital computer (CORDIC) blocks.

In another embodiment, a method includes determining channel state information (CSI) for a single data stream transmitted via a plurality of antennas, and determining cophasing angles for the plurality of antennas using the CSI. The method also includes generating explicit CSI feedback using the cophasing angles.

DETAILED DESCRIPTION

Figure 1:
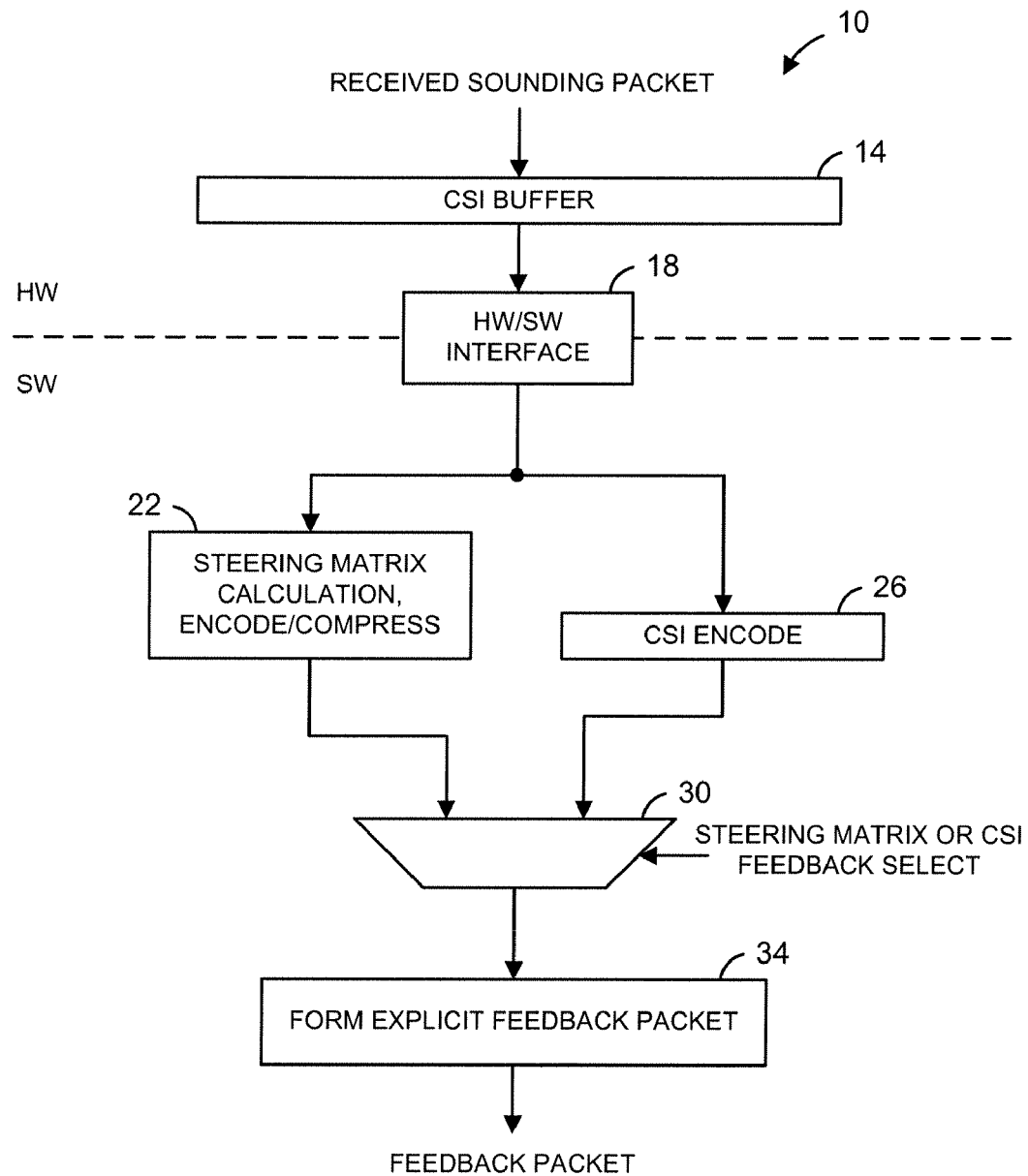
FIG. 1 is a block diagram illustrating explicit beamforming implemented in a prior art beamformee transceiver.

While the beamforming techniques described herein for processing and effecting a wireless data transmission are described as being used in communication systems that use one of the IEEE Standard 802.11x communication standards, these techniques may be used in various other types of wireless communication systems and are not limited to those conforming to one or more of the IEEE Standard 802.11x standards. As just some examples, the beamforming techniques may also be used in conjunction with systems that conform to the IEEE 802.16e/m standards, the Long Term Evolution (LTE) standard (now in the process of being adopted) of the Third Generation Partnership Project (3GPP), etc.

MIMO may achieve spatial multiplexing gain when multiple streams are transmitted over MIMO channel to increase the data rate. MIMO may also achieve diversity gain when a single stream is transmitted separately on multiple independent wireless links to increase reliability. In a MIMO system where reliability dominates the overall system performance (e.g., when the signal-to-noise ratio (SNR) is low), it may be appropriate to transmit only a single steam and to utilize diversity gain. On the other hand, in a multiple input, single output (MISO) system (i.e., multiple transmit antennas and a single receive antenna), the physical configuration limits the number of streams that can be transmitted between the two stations to one. The transmit beamforming techniques described herein may be utilized in MIMO and MISO systems in which only a single stream is transmitted.

With transmit beamforming in the context of a single stream, the transmitted signal can be modeled as:

$$y = HV_{steer}s + n \quad \text{(Equation 1)}$$

where y is a $N_R \times 1$ received signal vector, H is an $N_R \times N_T$ matrix corresponding to the MIMO/MISO channel response, $v_{steer}$ is a single column steering vector, s is the data symbol transmitted on the single stream, n is an $N_R \times 1$ additive noise vector, $N_R$ is the number of receive antennas, and $N_T$ is the number of transmit antennas. $v_{steer}$ is applied at the transmitter, and is designed according to the current channel state information (CSI), i.e., H. In other words, knowledge of the channel is leveraged to increase signal directivity (translates to receive SNR gain) and exploit spatial diversity gain. In an OFDM system, the model according to Equation 1 may be applied for each subcarrier, or for each of a plurality of groups of adjacent subcarriers. With a properly designed steering vector $v_{steer}$ the received strength (or SNR) on the single stream can be greatly improved, so that the reliability of the signal or the operable range of the wireless system can be extended. Both increased reliability and extended range are often valuable in wireless communication systems such as WLAN and WiMAX systems.

But the channel, H, will typically vary over time. Thus, the steering vector $v_{steer}$ should be updated as H changes. There are two options for a transmitter to maintain a steering vector that tracks a changing channel: implicit beamforming and explicit beamforming. In implicit beamforming, the beamformer (i.e., the station that transmits a beamformed signal) will estimate the forward channel (beamformer to beamformee (i.e., the station that receives the beamformed signal) from reverse channel sounding (i.e., the beamformee sends sounding (or training) signals to the beamformer, and the beamformer estimates the reverse channel estimation). The beamformer may then estimate the forward channel by transposing the reverse channel estimate (assuming reciprocity between the forward channel and the reverse channel). By periodically implicitly estimating the forward channel, the beamformer can seek to maintain an up-to-date estimate of the forward channel, and thus an up-to-date beamsteering vector. However, the reverse and forward channels may not be fully reciprocal due to the mismatch between transmit and receive radio frequency (RF) circuitry, for example.

In explicit beamforming, the beamformer sends sounding signals to the beamformee. The beamformee then estimates the forward channel and feeds back the CSI of the forward channel to the beamformer. Optionally, the beamformee may compute the steering vector $v_{steer}$ and feed $v_{steer}$ back to the beamformer. By periodically receiving CSI for the forward channel, or a steering vector, from the beamformee, the beamformer can seek to maintain an up-to-date estimate of the forward channel and/or an up-to-date beamsteering vector. The beamforming techniques described further below utilize explicit beamforming.

A more detailed explanation of explicit beamforming in the context of a system operating according to the IEEE 802.11n Standard is now provided. It will be understood, however, that explicit beamforming in other types of systems will operate similarly. First, the beamformer sends a sounding packet to the beamformee. Upon receiving the sounding packet, the beamforinee may estimate H (i.e., CSI) for the forward channel based on the received sounding packet. Then, the beamformee may transmit the CSI back to the beamformer. Alternatively, the beamformee may compute the steering vector $v_{steer}$ based on the CSI, and may then transmit $v_{steer}$ back to the beamformer. If the beamformer receives the CSI, the beamformer may compute the steering vector $v_{steer}$ based on the CSI, and then apply $v_{steer}$ for transmitting subsequent packets (Equation 1). If the beamformer receives $v_{steer}$ from the beamformee, the beamformer may merely apply $v_{steer}$ for transmitting subsequent packets.

The IEEE 802.11n Standard specifies that, if H is fed back in explicit beamforming, encoding on H should be utilized. Similarly, the IEEE 802.11n Standard specifies that, if $v_{steer}$ is fed back, $v_{steer}$ should be either encoded or compressed. Thus, the beamformee may be required to not only compute H and/or $v_{steer}$ but also to performing encoding or compression on H or $v_{steer}$. Typically, $v_{steer}$ calculation and encoding/compression are implemented by a processor executing software instructions. FIG. 1 is a block diagram illustrating explicit beamforming implemented in a prior art beamformee transceiver 10. The prior art device includes hardware (HW) for implementing physical layer operations such as receiving signals, demodulating the received signals, and decoding the received signals to retrieve data transmitted by the beamformer. The prior art device also includes a general purpose processor that executes software instructions (SW) to perform media access control (MAC) layer operations. In FIG. 1, a dotted line indicates the demarcation between hardware and software in the beamformee 10.

The beamformee 10 includes a CSI buffer 14 for storing CSI for the forward channel. A hardware/software interface 18 generally permits communication of data between the hardware and software portions of the beamformee 10. The software portion includes a module 22 for calculating the steering matrix and encoding or compressing the steering matrix when the steering matrix is to be fed back to the beamformer. The software portion also includes a module 26 for encoding the CSI when the CSI is to be fed back to the beamformer. The software portion also may include a module 30 for selecting steering vector feedback or CSI feedback. The software portion also may include a module 34 for forming a feedback packet that includes the steering vector or the CSI.

In operation, the hardware stores the estimated CSI for the forward channel in the CSI buffer 14. Next, the CSI stored in the CSI buffer 14 is provided to the software portion via the hardware/software interface 18. Next, the software portion processes the CSI by either encoding the CSI (block 26), or calculating the steering matrix and encoding/compressing the steering matrix (block 22). Then, either the encoded CSI or the encoded/compressed steering matrix is transmitted back to the beamformer.

The performance of the system 10 is generally limited by the software processing. For example, the CSI usually includes a large quantity of data, and the hardware/software interface 18 is a relatively slow and limited, shared resource. For example, the hardware/software interface 18 may need to exchange a variety of data between the hardware and software due to various MAC layer processing. Thus, the CSI data will typically be transferred intermittently, block-by-block by the hardware/software interface 18. Additionally, steering matrix calculation, encoding, and compression are time intensive operations. Delay between receiving the sounding packet and transmitting the CSI or steering matrix feedback will adversely affect performance of beamforming. In particular, the forward channel is time varying, and thus the CSI or steering matrix feedback may be stale by the time the beamformer receives it. This is may be more pronounced when the beamformee is a handheld device (e.g. a mobile phone).

Figure 2:
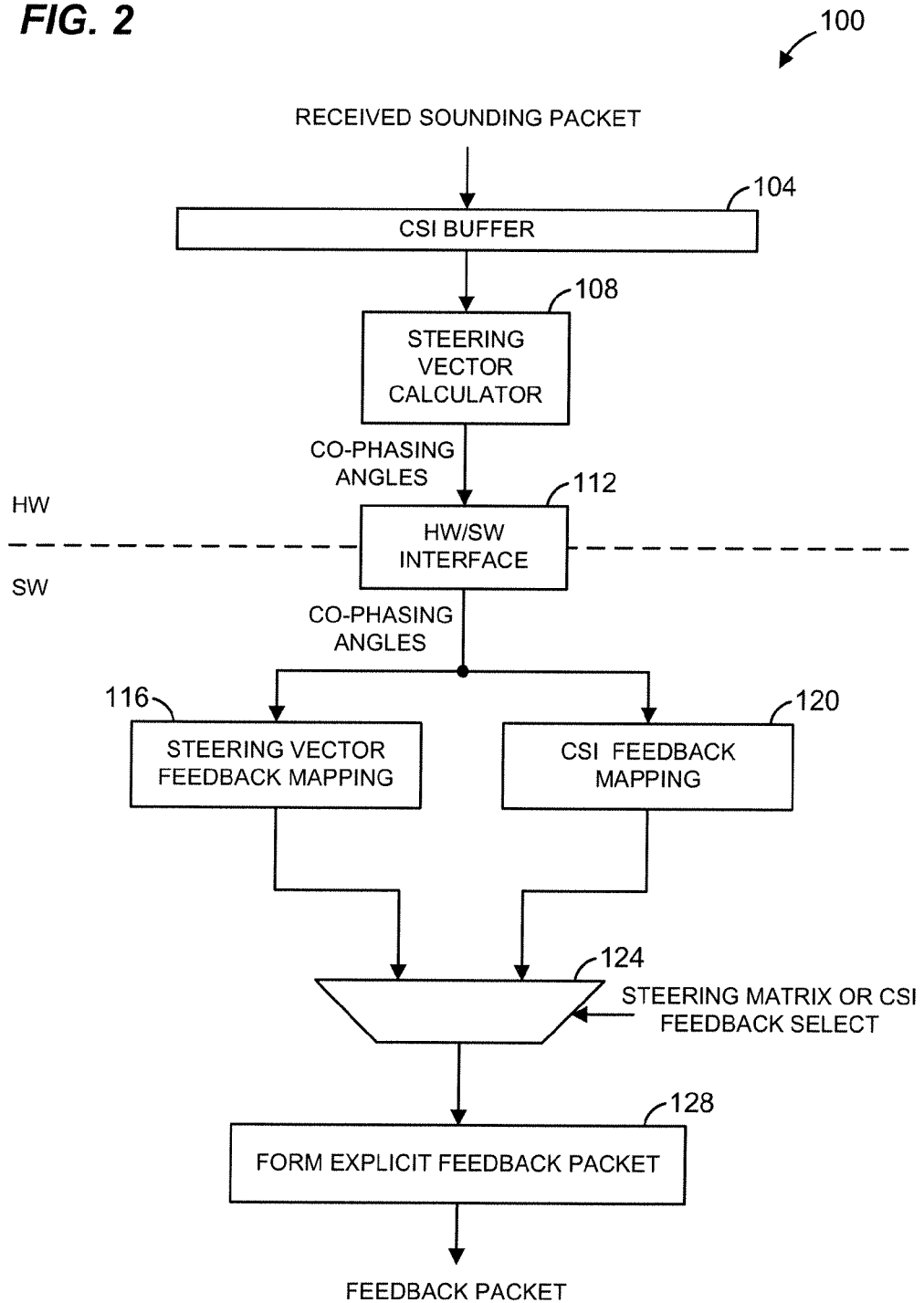
FIG. 2 is a block diagram illustrating explicit beamforming implemented in a beamformee transceiver according to one embodiment.

FIG. 2 is a block diagram illustrating explicit beamforming implemented in a beamformee transceiver 100. The explicit beamforming implemented in the beamformee transceiver 100 is for a scenario in which one stream of data is to be transmitted. The transceiver 100 includes hardware (HW) for implementing physical layer operations such as receiving signals, demodulating the received signals, and decoding the received signals to retrieve data transmitted by the beamformer. The transceiver 100 also includes a processor that executes software instructions (SW) to perform, for example, MAC layer operations. The processor may include or be coupled to a memory in which machine readable instructions are stored. When executed by the processor, the machine readable instructions may cause the processor to perform various operations to be described below with respect to the software portion of FIG. 2. In FIG. 2, a dotted line indicates the demarcation between hardware and software in the beamformee 100.

The beamformee 100 includes a CSI buffer 104 for storing CSI for the forward channel. The CSI may correspond to a sounding packet transmitted by the beamformer, for example, and may be generated by the hardware. A steering vector calculator 108 is coupled to the CSI buffer 104. The steering vector calculator 108 generates a steering vector based on the CSI in the CSI buffer 104 using, for example, a cophasing algorithm. The result of the cophasing algorithm is a set of cophasing angles for each OFDM subcarrier (or for each group of adjacent subcarriers). The number of cophasing angles per subcarrier (or group of adjacent subcarriers) may correspond to the number of transmit antennas. The steering vector calculator 108 may also quantize each cophasing angle, such as quantizing each cophasing angle to a desired number of bits. For example, the steering vector calculator 108 may quantize each cophasing angle to three bits. Of course, cophasing angles may be quantized by some other degree, such as by two bits, four bits, five bits, six bits, etc.

A hardware/software interface 112 permits the cophasing angles generated by the steering vector calculator 108 to be communicated to the software portion (i.e., the portion that is implemented by a processor executing software instructions) of the beamformee 100. The software portion includes a steering vector feedback mapping module 116 for mapping the quantized cophasing angles generated by the hardware into either encoded or compressed steering vector elements. As will be discussed subsequently, mapping the quantized cophasing angles generated by the hardware into either encoded or compressed steering vector elements may be implemented using a look-up table, for example.

The software portion includes a CSI feedback mapping module 120 for mapping the quantized cophasing angles generated by the hardware into CSI feedback elements. As will be discussed subsequently, mapping the quantized cophasing angles generated by the hardware into CSI feedback elements may be implemented using a look-up table, for example.

The software portion also includes logic 124 for selecting either steering vector feedback or CSI feedback. Although illustrated in FIG. 2 as a multiplexer that selects between the output of the module 116 and the module 120, the logic 124 may alternatively select which of the module 116 and the module 120 is executed. After the steering vector feedback or the CSI feedback has been generated, a module 128 may form a feedback packet or frame for transmission to the beamformer.

An example cophasing algorithm that can be used for implementing the block 108 of FIG. 2 will now be described. Cophasing (which is also sometimes referred to as equal gain combining (EGC) is a single-stream steering calculation approach. Cophasing attempts to make the phase of the channel coefficients from different transmit antennas to one receive antenna identical. In the case of one receive antenna, the forward channel can be represented as:

$$H = [h_1 h_2 \ldots h_{N_T}] \qquad \text{(Equation 2)}$$

so the steering vector can be designed as:

$$v_{steer} = \begin{bmatrix} e^{j\Delta\theta_{N_T}1} \\ e^{j\Delta\theta_{N_T}2} \\ \vdots \\ e^{j\Delta\theta_{N_T}(N_T-1)} \\ 1 \end{bmatrix} \qquad \text{(Equation 3)}$$

where $\Delta\theta_{N_T i} = \theta_{N_T} - \theta_i$, for $i=1, \ldots N_T-1$, and $\theta_i$ is the angle of the complex channel coefficient $h_i$. So the "steered" transmitted signal model can be modeled as:

$$y = [h_1 \; h_2 \; \ldots \; h_{N_T}] \begin{bmatrix} e^{j\Delta\theta_{N_T}1} \\ e^{j\Delta\theta_{N_T}2} \\ \vdots \\ 1 \end{bmatrix} s + n = \qquad \text{(Equation 4)}$$

-continued $$\left( e^{j\theta_{N_T}} \sum_{i=1}^{N_T} \|h_i\| \right) s + n$$

The received SNR is enhanced due to the combining. The steering vector of Equation 3 cophases to the last transmit antenna (i.e., the $N_T$-th antenna), but it will be understood by those of ordinary skill in the art that, in other implementations, cophasing to any of the other transmit antenna may also be implemented.

In another embodiment, one or more of the blocks 116, 120, 124 and 128 may also be implemented in hardware. For example, all of the blocks 116, 120, 124 and 128 may be implemented in hardware configured to implement MAC layer operations. An "all hardware" implementation of steering vector feedback/CSI feedback generation may be particularly useful for scenarios in which very fast feedback is desired.

Figure 3:
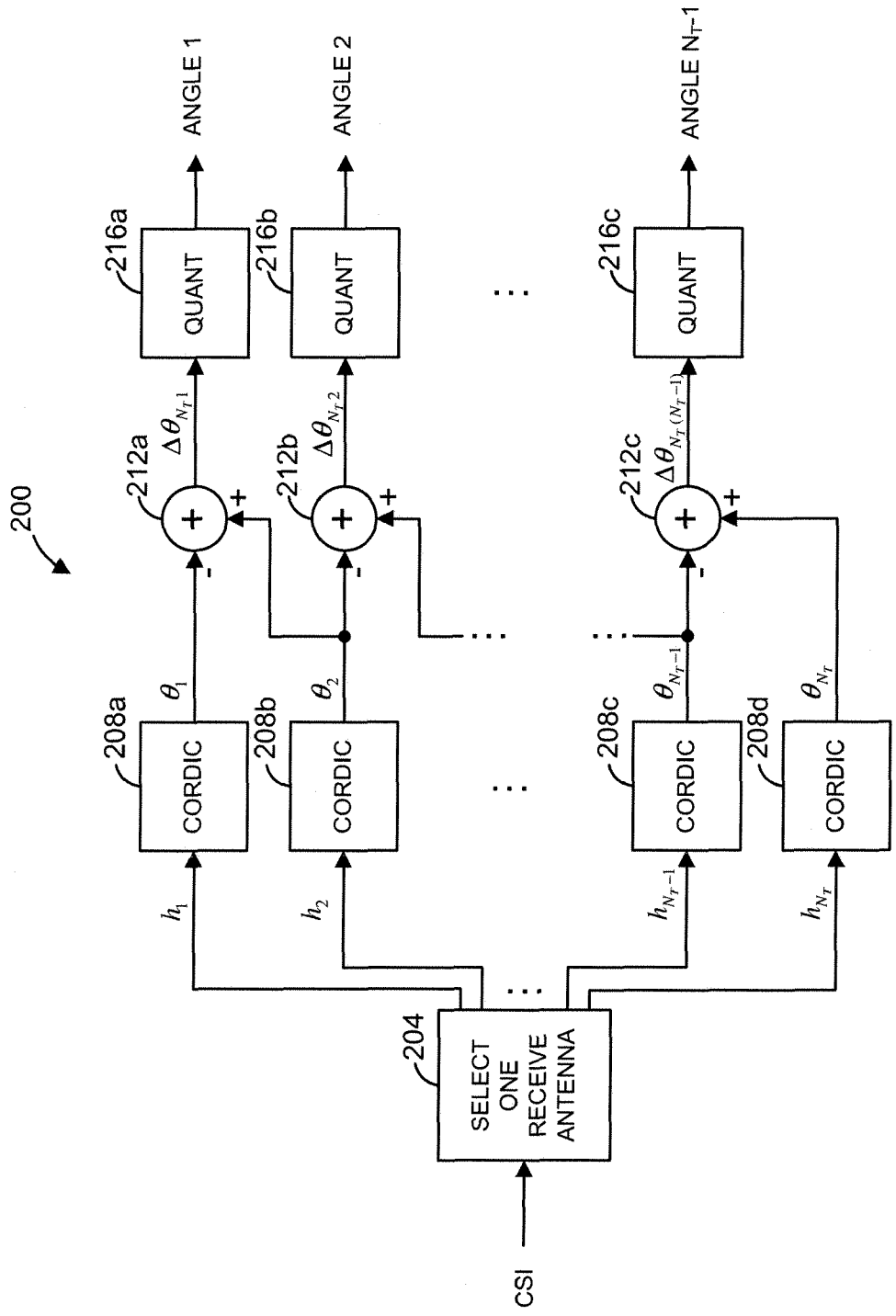
FIG. 3 is a block diagram of an example steering vector calculator that may be utilized in the example transceiver of FIG. 2.

FIG. 3 is a block diagram of an example steering vector calculator 200 that may be utilized for the steering vector calculator 108 of FIG. 2. It will be understood, however, that a steering vector calculator other than the steering vector calculator 200 may also be utilized for the steering vector calculator 108 of FIG. 2.

If the beamformee includes multiple receive antennas, the steering vector calculator 200 may include a selection block 204 for selecting one of the receive antennas to which to cophasing is performed. For example, the receive antenna with the strongest forward channel response may be selected. Determining which receive antenna is the strongest may include calculating the row norm of the forward channel H matrix (based on the CSI) associated with each receiver antenna. The row norm for the l-th antenna, $g_l$, may be calculated as:

$$g_l = \sum_{i=1}^{N_T} \|h_{li}\|, l = 1 \ldots N_R \quad \text{(Equation 5)}$$

Then, the receive antenna corresponding to the largest row norm may be selected as the antenna to which cophasing is to be performed. If there is only one receive antenna, the block 204 may be omitted.

The row coefficients $h_1, h_2, \ldots, h_{N_T}$ corresponding to the one receive antenna, or if there are multiple receive antennas, the selected receive antenna, are provided to a plurality of coordinate rotation digital computer (CORDIC) blocks 208. Each CORDIC block 208 generally computes the phase of the corresponding row coefficient $h_i$. Although in FIG. 3 a separate CORDIC block 208 is illustrated for each row coefficient, it will be understood that one or some other number less than $N_T$ of CORDIC blocks 208 may be utilized by, for example, time sharing the CORDIC block(s) 208. In other implementations, hardware that implements an algorithm other than the CORDIC algorithm may be utilized to calculate the phases of the row coefficients.

Outputs of the CORDIC blocks 208 are provided to a plurality of subtractors 212. The subtractors 212 calculate subtractions $\Delta\theta_{N_Ti} = \theta_{i+1} - \theta_i$, for $i=1, 2, \ldots, N_T-1$. Although in FIG. 3, $N_T-1$ subtractors 212 are illustrated, it will be understood that one or some other number less than $N_T-1$ of subtractors 212 may be utilized by, for example, time sharing the subtractor(s) 212.

Figure 4:
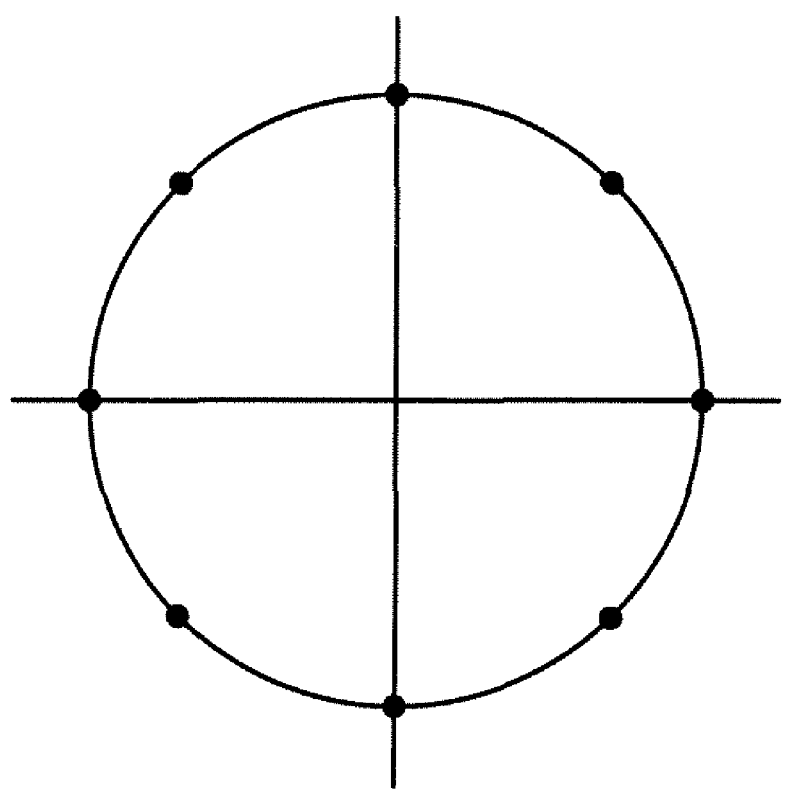
FIG. 4 is a graph illustrating example angle quantization to 8 possible angles.

Outputs of the subtractors 212 are provided to a plurality of quantizers 216 that quantize the outputs of the subtractors to some desired number of bits. Quantization with a relatively small number $N_a$ of bits (e.g., $N_a=3$ bits) for each of the cophasing angles results in a steering vector that achieves acceptable beamforming performance gain. In an OFDM system, the total amount of data per subcarrier delivered to the software portion through the hardware/software interface is now $N_a*(N_T-1)$ bits. This is far less data than if the whole channel matrix H per subcarrier is sent through the hardware/software interface. FIG. 4 is a graph illustrating example angle quantization for $N_a=3$ bits, resulting in 8 possible angles (indicated in FIG. 4 by the black circles on the circumference of the larger circle). The outputs of the quantizers 216 are output by the example steering vector calculator 200 as $N_T-1$ co-phasing angles.

Although in FIG. 3, $N_T-1$ quantizers 216 are illustrated, it will be understood that one or some other number less than $N_T-1$ of quantizers 216 may be utilized by, for example, time sharing the quantizer(s) 216.

Referring again to FIG. 2, the software portion of the beamformee 100 receives, via the hardware/software interface 112, the cophasing angles generated by the steering vector calculator 108. The software portion of the beamformee 100 generally uses the cophasing angles to generate the steering vector feedback or the CSI feedback. In one implementation, the software portion of the beamformee 100 may include pre-stored feedback content that corresponds to all of the possible cophasing angles. The steering vector or CSI feedback may then be generated by selecting from the pre-stored feedback content using the cophasing angles. For example, the feedback may be generated using one or more look-up tables (LUTs). In such implementations, feedback can be generated without performing encoding or compression each time feedback needs to be provided.

For example, if encoded steering vector feedback according to the IEEE 802.11n standard is to be generated (i.e., non-compressed steering vector feedback), the cophasing angles generated by the steering vector calculator 108 translate into the steering vector according to Equation 3. The real part and the imaginary part of each steering vector element can each be represented by $N_b$ bits, for example. Table 1 is an example LUT for $N_a=3$ and $N_b=2$ and for a non-compressed steering vector feedback compliant with the IEEE 802.11n standard.

TABLE 1

| 3 bit Angle $\Delta\theta_{N_Ti}$ | i-th complex element in $v_{steer}$ |
|---|---|
| 0 (b000) | 1 |
| 1 (b001) | $1 + j$ |
| 2 (b010) | $j$ |
| 3 (b011) | $-1 + j$ |
| 4 (b100) | $-1$ |
| 5 (b101) | $-1 - j$ |
| 6 (b110) | $-j$ |
| 7 (b111) | $1 - j$ |

The quantized cophasing angles can be used as indices into the LUT of Table 1.

As another example, if compressed steering vector feedback according to the IEEE 802.11n standard is to be generated, actual compressing need not be performed each time the compressed steering vector feedback is to be generated. Rather, a LUT similar to Table 1 may be utilized to lookup compressed steering vector feedback elements based on the cophasing angles. For example, the quantized cophasing angles can be used as indices into the LUT.

As yet another example, if CSI feedback according to the IEEE 802.11n standard is to be generated, the cophasing angles may be converted into CSI information. In particular, the CSI feedback, $H_{FB}$, may be estimated by:

$$H_{FB} = v_{steer}^H \quad \text{(Equation 6)}$$

$$H_{FB} = \begin{bmatrix} e^{-j\Delta\theta_{N_T 1}} & e^{-j\Delta\theta_{N_T 2}} & \cdots & e^{-j\Delta\theta_{N_T(N_T-1)}} & 1 \end{bmatrix} \quad \text{(Equation 7)}$$

If the beamformer then uses a classical approach to calculating the steering vector using $H_{FB}$, such as transmit maximum ratio combining (TxMRC) or cophasing, the beamformer will then generate its steering vector as the same $v_{steer}$ used to generate $H_{FB}$ in Equation 6.

The real part and the imaginary part of each CSI feedback element in $H_{FB}$ can each be represented by $N_b$ bits, for example. Table 2 is an example LUT for $N_a=3$ and $N_b=4$ and for CSI feedback compliant with the IEEE 802.11n standard.

TABLE 2

| 3 bit Angle $\Delta\theta_{N_T i}$ | i-th complex element in $H_{FB}$ |
|---|---|
| 0 (b000) | 4 |
| 1 (b001) | 4 − 4j |
| 2 (b010) | −4j |
| 3 (b011) | −4 − 4j |
| 4 (b100) | −4 |
| 5 (b101) | −4 + 4j |
| 6 (b110) | 4j |
| 7 (b111) | 4 + 4j |

The quantized cophasing angles can be used as indices into the LUT of Table 2.

Figure 5:
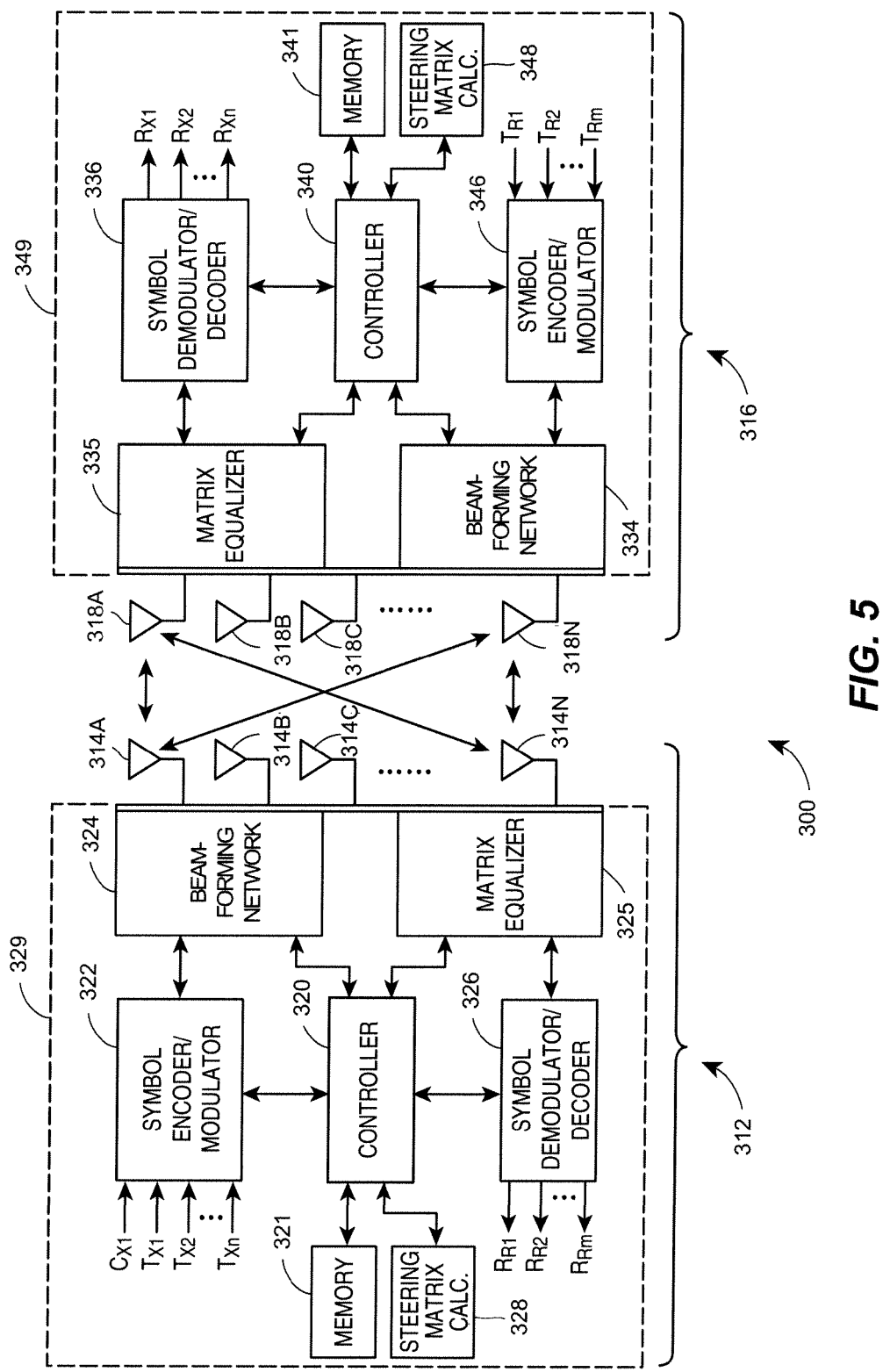
FIG. 5 is a block diagram of a wireless MIMO communication or transmission system that implements a transmitter beamforming technique using matrix equalizer information of a receiver.

Referring now to FIG. 5, a MIMO communication system 300 is illustrated in block diagram form as generally including a single transmitter 312 having multiple transmit antennas 314A-314N and a single receiver 316 having one or more receive antennas 318A-318M. The number of transmit antennas 314A-314N can be the same as or more than the number of receive antennas 318A-318M. As shown in FIG. 5, the transmitter 312 may include a controller 320 coupled to a memory 321, a symbol encoder and modulator unit 322 and a beamforming block 324, also referred to herein as a transmit beamforming network. The transmitter 312 may also include a matrix equalizer 325 and a symbol demodulator and decoder unit 326 to perform demodulation and decoding of signals received via the antennas 314A-314N in a receive mode. Additionally, the transmitter 312 may include a steering matrix calculation unit 328. The steering matrix calculation unit 328 may generate a steering matrix based on explicit forward channel CSI feedback from the receiver 316.

The controller 312 may be any desired type of controller and both the controller 312 and the steering matrix calculation unit 328 may be implemented as one or more standard multi-purpose, programmable processors, such as micro-processors, as application specific integrated circuits (ASICs), etc., or may be implemented using any other desired types of hardware, and/or programmable processors (i.e., processors that execute software and/or firmware instructions). Likewise, the beamforming network 324, and the matrix equalizer 325 may be implemented using known or standard hardware and/or programmable processor elements. If desired, various of the transmitter components, such as the controller 320, the modulator unit 322, the demodulator unit 326, the steering matrix calculation unit 328, the beamforming network 324 and the matrix equalizer 325 may be implemented in the same or in different hardware devices, such as in the same or different processors. Additionally, each of these components of the transmitter 312 may be disposed in a housing 329 (shown in dotted relief in FIG. 5). Still further, the routines or instructions for implementing the functionality of any of these components may be stored in the memory 321 or within other memory devices associated with the individual hardware used to implement these components.

During operation, information signals $T_{x1}$-$T_{xn}$ which are to be transmitted from the transmitter 312 to the receiver 316 are provided to the symbol encoder and modulator unit 322 for encoding and modulation. Of course, any desired number of signals $T_{x1}$-$T_{xn}$ may be provided to the modulator unit 322, with this number generally being limited by the modulation scheme used by and the bandwidth associated with the MIMO communication system 300. Additionally, the signals $T_{x1}$-$T_{xn}$ may be any type of signals, including analog or digital signals, and may represent any desired type of data or information. Additionally, a known test or control signal $C_{x1}$ (which may be stored in the memory 321) may be provided to the symbol encoder and modulator unit 322 so that it can be transmitted to the receiver 316. The receiver 316 can then utilize the control signal $C_{x1}$ to determine forward channel CSI describing the characteristics of the forward channel from the transmitter 312 to the receiver 316. The same control signal or a different control signal may be used to determine the CSI for each frequency used in the MIMO communication system 300. The control signal $C_{x1}$ may be referred to as a sounding packet.

The symbol encoder and modulator unit 322 may interleave digital representations of the various signals $T_{x1}$-$T_{xn}$ and $C_{x1}$ and may perform any other known type(s) of error-correction encoding on the signals $T_{x1}$-$T_{xn}$ and $C_{x1}$ to produce a stream of symbols to be modulated and sent from the transmitter 312 to the receiver 316. While the symbols may be modulated using any desired or suitable QAM technique, such as using 64 QAM, these symbols may be modulated in any other known or desired manner including, for example, using any other desired phase and/or frequency modulation techniques. In any event, the modulated symbol stream is provided by the symbol encoder and modulator unit 322 to the beamforming network 324 for processing before being transmitted via the antennas 314A-314N. While not specifically shown in FIG. 5, the modulated symbol streams may be up-converted to the RF carrier frequencies associated with an OFDM technique (in one or more stages) before being processed by the beamforming network 324. Upon receiving the modulated signals, the beamforming network 324 processes the modulated signals by injecting delays and/or gains into the modulated signals based on a steering vector provided by the controller 20 or the steering matrix calculation unit 328, to thereby perform beamforming via the transmit antennas 14A-14N.

The signals transmitted by the transmitter 312 are detected by the receive antennas 318A-318M and may be processed by a matrix equalizer 335 within the receiver 316 to enhance the reception capabilities of the antennas 318A-318M. As will be understood, the processing applied at the receiver 316 (as well as at the transmitter 312) may be based on, for example, the CSI developed by the receiver 316 in response to the transmission of the test or control signal $C_{x1}$ (i.e., sounding packet). In any event, a symbol demodulator and decoder unit 336, under control of a controller 340, may decode and demodulate the received symbol strings as processed by the matrix equalizer 335. In this process, these signals may be downconverted to baseband. Generally, the matrix equalizer 335 and the demodulator and decoder unit 336 may operate to remove effects of the channel based on the CSI as well as to perform demodulation on the received symbols to produce a digital bit stream. In some cases, if desired, the symbol demodulator and decoder unit 336 may perform error correction decoding and deinterleaving on the bit stream to produce the received signals $R_{x1}$-$R_{xn}$ corresponding to the originally transmitted signals $T_{x1}$-$T_{xn}$.

A steering matrix calculation unit 348 may generate explicit forward channel beamforming feedback based on the control signal $C_{x1}$ as described above. In one implementation, the steering matrix calculation unit 348 may include both the hardware and software portions in FIG. 2. In another implementation, the steering matrix calculation unit 348 may include the hardware portion of FIG. 2, and the controller 340 may include the software portion of FIG. 2. Additionally, the steering matrix calculation unit 348 may include the hardware/software interface 112 (or a portion thereof). In another implementation, the controller 340 may include the hardware/software interface 112 (or a portion thereof). The controller 340 may cause the explicit forward channel beamforming feedback to be transmitted to the transmitter 312.

As shown in FIG. 5, the receiver 316 may also include a memory 341 and a symbol encoder and modulator unit 346 which may receive one or more signals $T_{R1}$-$T_{Rm}$ which may be encoded and modulated using any desired encoding and modulation techniques. If the receiver 316 includes multiple antennas 318A-318N, the encoded and modulated symbol stream may then be upconverted and processed by a beamforming network 334 to perform beamsteering based on a steering matrix. If the receiver 316 only includes a single antenna, the beamforming network 334 may be omitted. Then, the upconverted signals are transmitted via the antenna(s) 318A-318N to, for example, the transmitter 312, thereby implementing the reverse link. As shown in FIG. 5, each of the receiver components may be disposed in a housing 349.

The matrix equalizer 325 and the demodulator/decoder unit 326 within the transmitter 312 operate similarly to the matrix equalizer 335 and the demodulator/decoder unit 336 of the receiver 316 to demodulate and decode the signals transmitted by the receiver 316 to produce the recovered signals $R_{R1}$-$R_{Rm}$. Here again, the matrix equalizer 325 may process the received signals in any known manner to enhance the separation and therefore the reception of the various signals transmitted by the antenna(s) 318A-318M. As noted above, the CSI, steering vectors/matrices, beamforming and other programs and data used by the units 328 and 348 and by the controllers 320 and 340 may be stored in the memories 321 and 341.

As is generally known, beamforming or beamsteering typically includes applying appropriate phases and gains to the various signals as sent through the multiple transmit antennas 314A-314N, in a manner with causes the signals sent from the different transmit antennas 314A-314N to constructively interact (add in phase) in certain predetermined directions and to deconstructively interact (cancel) in other directions. Thus, beamforming typically produces a beam pattern having high gain regions (referred to as high gain lobes) in various predetermined directions and low gain regions (typically referred to as nulls) in other directions. The use of beamforming techniques in a MIMO system enables a signal to be sent with high gain (as compared to an omni-directional antenna) in certain directions, and to be sent with low gain (as compared to an omni-directional antenna) in other directions. Thus, in the MIMO system 300 of FIG. 5, beamforming may be used to enhance signal directivity towards the receive antenna(s) 318A-318M, which improves the SNR of the transmissions and results in more reliable transmissions. In this case, the beamforming technique will generally form high gain lobes in the direction of propagation at which the highest gain is desired, and in particular in the directions of propagation from the transmitter 312 to each of the one or more receive antennas 318A-318M of the receiver 316.

At least some of the various blocks, operations, and techniques described above may be implemented in hardware, in a processor executing firmware instructions, in a processor executing software instructions, or any combination of thereof. When implemented using a processor that executes software/firmware instructions, the software/firmware may be stored in any computer readable memory such as on a magnetic disk, an optical disk, or other storage medium, in a RAM or ROM or flash memory, processor, hard disk drive, optical disk drive, tape drive, etc. Likewise, the software or firmware may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware may include machine readable instructions that are capable of causing one or more processors to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

The invention claimed is:

1. A method, comprising:
   determining, in hardware, channel state information (CSI) for a single data stream transmitted via a plurality of antennas;
   determining, in hardware, cophasing angles for the plurality of antennas using the CSI;
   quantizing, in hardware, the cophasing angles;
   selecting, in a controller coupled to the hardware, either steering vector feedback or explicit beamforming feedback for transmission;

generating, in the controller, the steering vector feedback based on the quantized cophasing angles when the steering vector feedback is selected for transmission; and generating, in the controller, the explicit beamforming CSI feedback based on using the quantized cophasing angles as indices into a look-up table when the explicit beamforming CSI feedback is selected for transmission.

2. The method of claim 1, wherein determining cophasing angles for the plurality of antennas comprises using a coordinate rotation digital computer (CORDIC).

3. The method of claim 1, wherein quantizing the cophasing angles comprises quantizing each cophasing angle to one of three bits or four bits.

4. The method of claim 1, wherein:
generating the explicit beamforming feedback is performed by the controller executing machine readable instructions; and
the method further comprises transferring the quantized cophasing angles from the hardware to the controller via a hardware/software interface.

5. The method of claim 1, wherein cophasing angles are determined for each subcarrier in an orthogonal frequency division modulation (OFDM) system.

6. The method of claim 1, wherein cophasing angles are determined for each of a plurality of groups of adjacent subcarriers in an orthogonal frequency division modulation (OFDM) system.

7. An apparatus, comprising:
a cophasing angle calculator to calculate a plurality of cophasing angles for a plurality of transmit antennas using channel state information (CSI);
a quantizer coupled to the cophasing angle calculator, the quantizer configured to quantize the plurality of cophasing angles; and
a controller coupled to the quantizer, the controller configured to
select either steering vector feedback or explicit beamforming feedback for transmission,
generate steering vector feedback based on the quantized cophasing angles when the steering vector feedback is selected for transmission, and
generate CSI feedback based on the quantized cophasing angles when the explicit beamforming feedback is selected for transmission.

8. The apparatus of claim 7, further comprising:
a hardware/software interface coupled to each of the quantizer and the controller; and
a memory coupled to the controller;
wherein the controller is configured to execute machine readable instructions stored in the memory.

9. The apparatus of claim 7, wherein the controller is configured to generate the explicit beamforming feedback based on using the quantized cophasing angles as indices into a look-up table.

10. The apparatus of claim 7, wherein the cophasing angle calculator includes one or more coordinate rotation digital computer (CORDIC) blocks.

11. The apparatus of claim 7, wherein the quantizer comprises a plurality of individual quantizer blocks.

12. The apparatus of claim 7, wherein the quantizer quantizes each cophasing angle to one of three bits or four bits.

13. A method, comprising:
determining, in hardware, channel state information (CSI) for a single data stream transmitted via a plurality of antennas;
determining, in hardware, cophasing angles for the plurality of antennas using the CSI;
selecting, in a controller coupled to the hardware, either steering vector feedback or explicit CSI feedback for transmission;
generating, in the controller, the steering vector feedback based on the cophasing angles when the steering vector feedback is selected for transmission; and
generating, in the controller, explicit CSI feedback using the cophasing angles when the explicit CSI feedback is selected for transmission.

14. The method of claim 13, further comprising quantizing the cophasing angles prior to generating the explicit CSI feedback.

15. The method of claim 14, wherein generating the explicit CSI feedback comprises generating the explicit CSI feedback based on using the cophasing angles as indices into a look-up table.

* * * * *